(12) United States Patent
Nafziger et al.

(10) Patent No.: US 6,564,535 B1
(45) Date of Patent: May 20, 2003

(54) DRIVE MECHANISM FOR CENTER GATHERING DOUBLE AUGERS OF A CROP HARVESTER

(75) Inventors: Brendon Nafziger, Canton, KS (US); Dwight E. Nickel, Newton, KS (US)

(73) Assignee: AGCO Corporation, Hesston, KS (US)

( * ) Notice: Subject to any disclaimer, the term of this patent is extended or adjusted under 35 U.S.C. 154(b) by 0 days.

(21) Appl. No.: 09/519,778

(22) Filed: Mar. 7, 2000

(51) Int. Cl.[7] ............................................. A01D 57/00
(52) U.S. Cl. ........................................ 56/14.5; 198/666
(58) Field of Search .......................... 299/78; 56/14.4, 56/14.5, 14.6, 364, 291, 6, 208, DIG. 1, 220, DIG. 15, 10.2 R, 16.4 R; 460/70, 114; 198/666, 672

(56) References Cited

U.S. PATENT DOCUMENTS

| | | | |
|---|---|---|---|
| 3,290,096 A | * 12/1966 | Stalker | 299/78 |
| 4,300,333 A | * 11/1981 | Anderson | 56/14.5 |
| 4,429,517 A | 2/1984 | Lohrentz et al. | |
| 5,975,644 A | * 11/1999 | Lang | 299/78 X |

OTHER PUBLICATIONS

Operator's Manual—MacDon 942 Multi–Crop Header and Hay Conditioner (46217 Issue 12/93) (front and back coverpages and pp. 52–53).
Parts Catalog—MacDon Model 942—Multi–Crop Header and Hay Conditioner (46216 Issue 2/95) (front and back cover pages and pp. 26–27).
Brochure—MacDon 7000 Multi–Crop Special (Part#12960) –Jan. 1990.

* cited by examiner

Primary Examiner—Robert E. Pezzuto
(74) Attorney, Agent, or Firm—Hovey Williams LLP

(57) ABSTRACT

Each crop consolidating auger assembly of a harvester includes an elongated, inner, stationary support that is mounted on the sidewall of the header in a cantilevered manner and extends inwardly from the sidewall into overlying relationship with the floor of the header. A longer, flighted housing of the assembly circumscribes the support and is rotatably carried thereby in coaxial relationship therewith. A hydraulic motor carried by the support adjacent its inboard end is drivingly connected to the interior surface of the wall of the housing by structure in the form of an annular connecting member and appropriate fasteners.

22 Claims, 4 Drawing Sheets

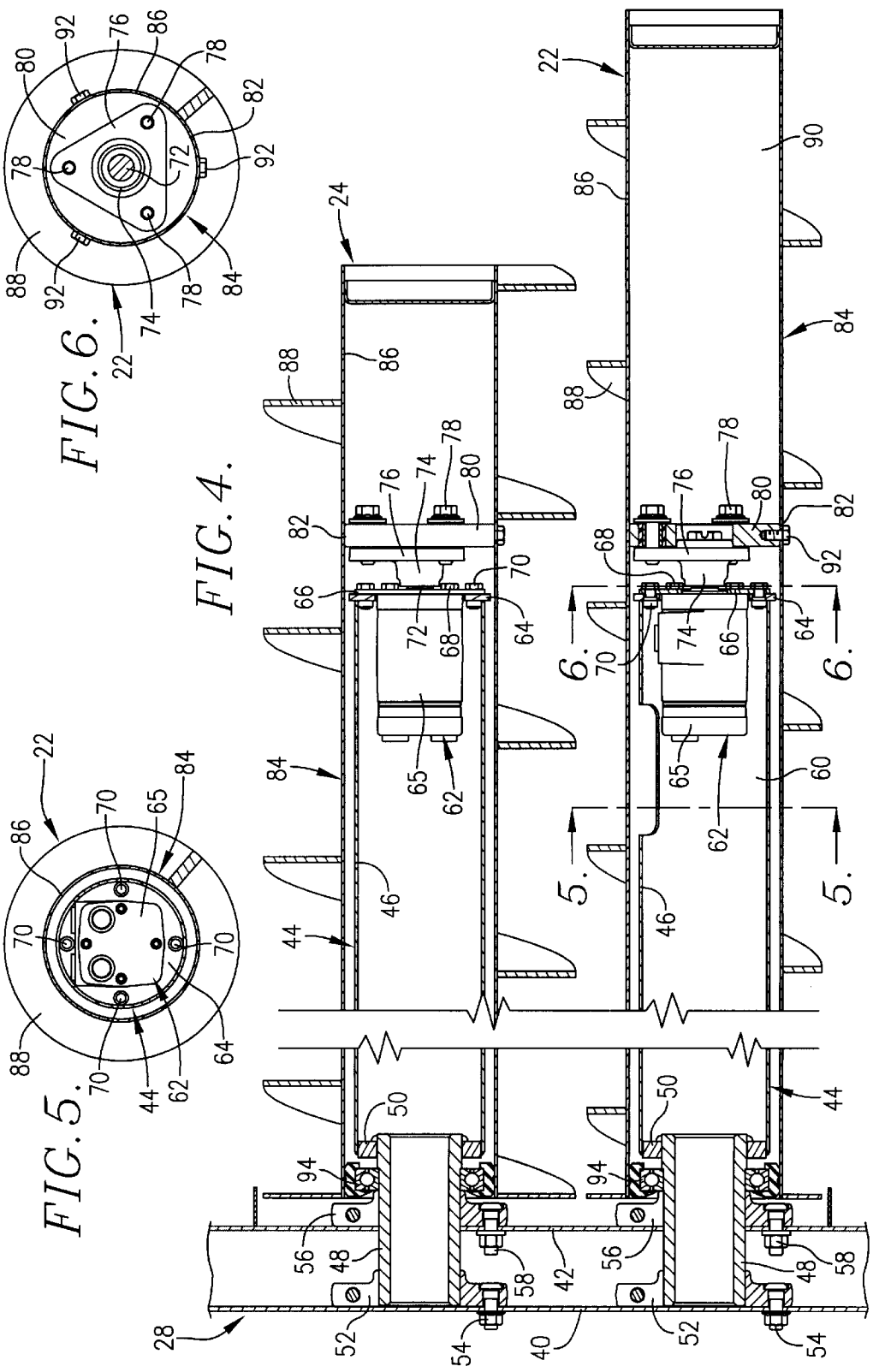

DRIVE MECHANISM FOR CENTER GATHERING DOUBLE AUGERS OF A CROP HARVESTER

TECHNICAL FIELD

This invention relates to crop harvesters and, more particularly, to improvements in auger assemblies utilized in such equipment.

BACKGROUND

Harvesters that mow standing grain crops and place the severed materials into a windrow typically utilize wide, flat aprons or draper belts for conveying the severed materials to a discharge opening on the machine through which the materials are ejected and formed into a windrow. Some manufacturers have started using consolidating augers in lieu of aprons for this purpose, but because the discharge opening is centrally located, the augers must extend in from opposite sides of the machine and terminate at the central opening without support in the area of the opening. This cantilevered mounting arrangement creates challenges in terms of properly supporting each of the auger assemblies and in supplying driving power thereto.

SUMMARY OF THE INVENTION

Accordingly, one important object of the present invention is to provide an improved way of supporting and driving crop harvester auger assemblies, particularly those utilized in connection with grain harvesting machines in which the mowed crops are gathered to a central opening on the machine immediately following severance and discharged through such opening to form a windrow. Each auger assembly in accordance with the present invention includes an internal, elongated, stationary support that is housed within a coaxial outer housing that rotates on the support. A power device, preferably in the form of a hydraulic motor, is housed within the support but has an output shaft projecting axially from the support and into a hollow chamber within the auger housing, at which location the shaft is drivingly connected to the wall of the housing.

BRIEF DESCRIPTION OF THE DRAWINGS

FIG. 4 is a fragmentary cross-sectional view of one pair of auger assemblies of the header taken substantially along line 4—4 of FIG. 3;

FIG. 5 is a transverse cross-sectional view through one of the auger assemblies taken substantially along line 5—5 of FIG. 4; and FIG. 6 is a transverse cross-sectional view through the same auger assembly as in FIG. 5 and taken substantially along lines 6—6 of FIG. 4.

DETAILED DESCRIPTION

Figure 1:
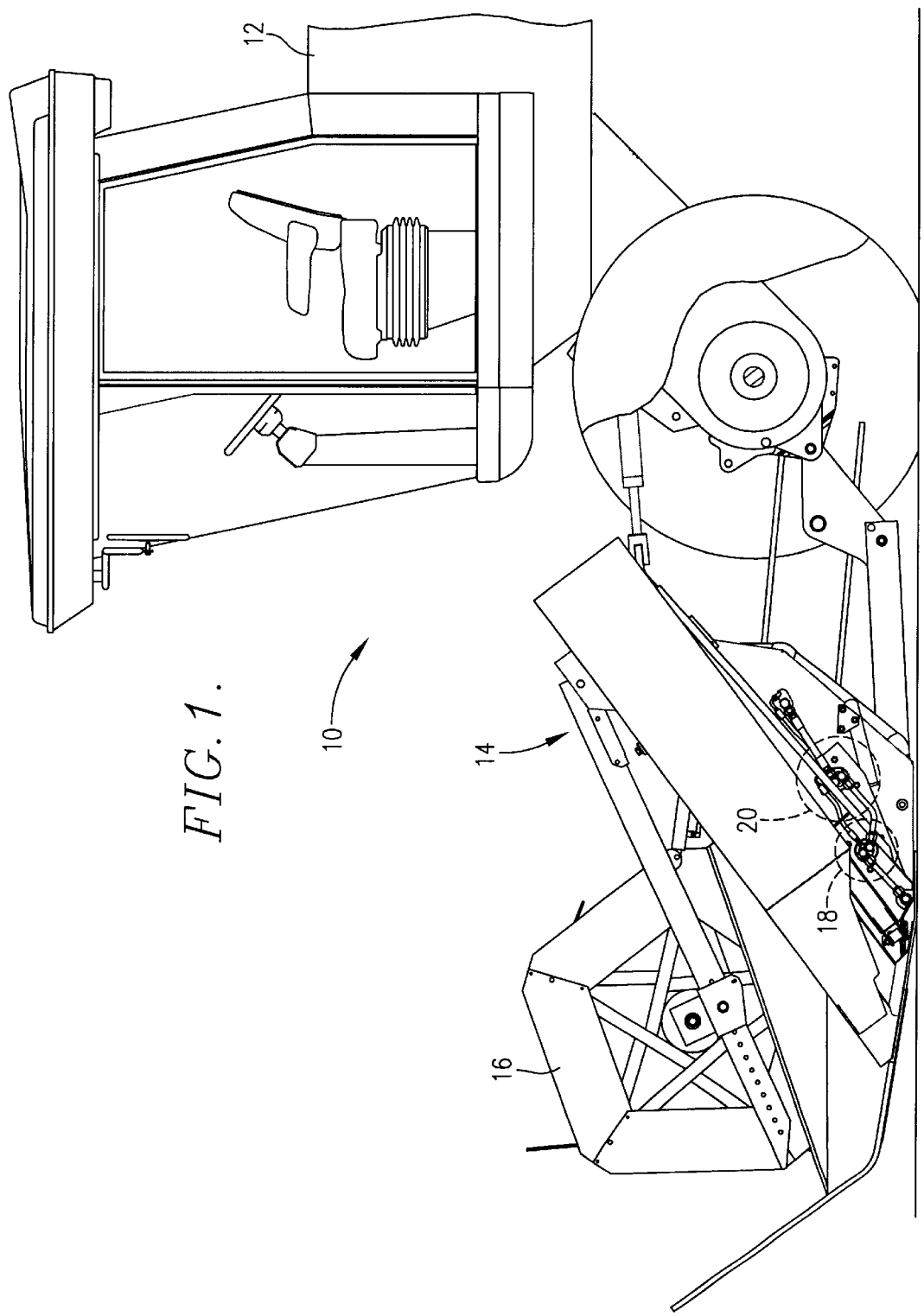
FIG. 1 is a fragmentary side elevational view of one type of harvester that may utilize auger assemblies in accordance with the present invention, the self-propelled harvester illustrated in FIG. 1 being shown for exemplary purposes only inasmuch as the principles of the present invention may be applied to pull-type machines as well.

The harvester 10 in FIG. 1, shown for purposes of illustration, includes a tractor 12 and a header 14 attached to the front of tractor 12. Header 14 includes a reel 16 that has been removed in the other figures to reveal details of construction. Phantom lines in FIG. 1 are used to designate a pair of left auger assemblies 18 and 20 that are shown in more detail in other figures.

Figure 2:
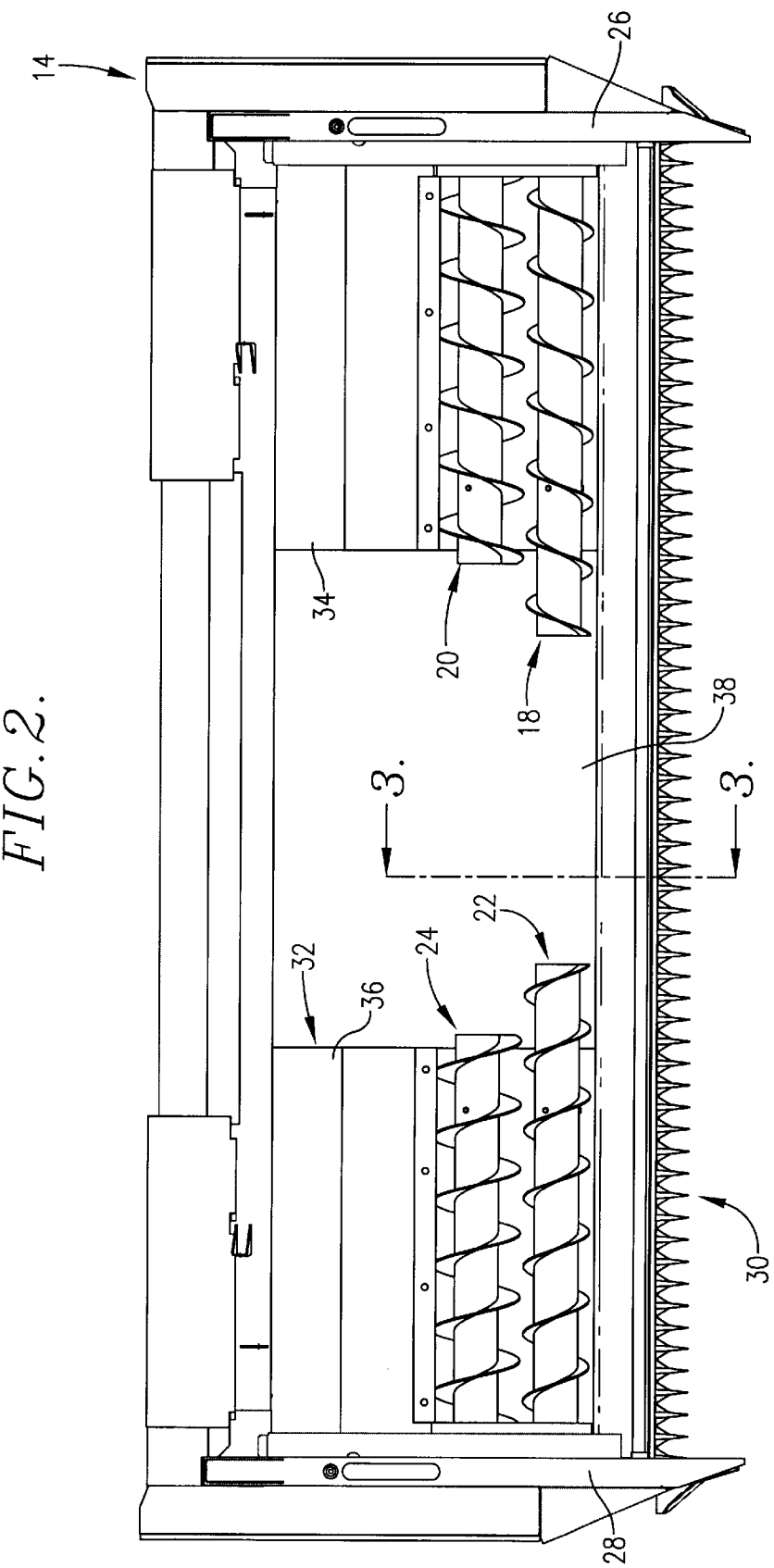
FIG. 2 is a top plan view of the header of the harvester in FIG. 1 with the reel removed to reveal the auger assemblies and other details of construction that are located beneath the reel.
Figure 3:
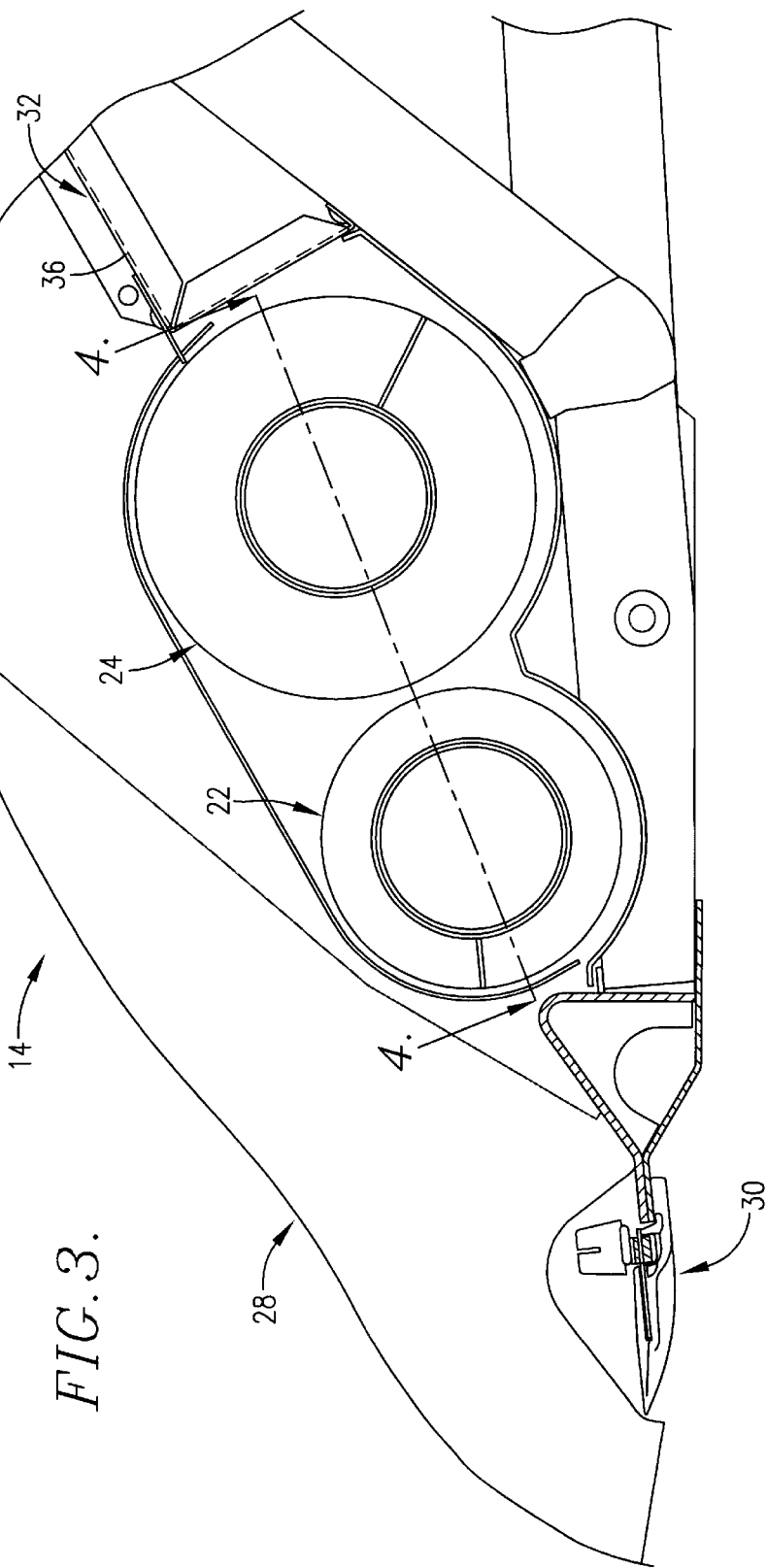
FIG. 3 is an enlarged, fragmentary cross-sectional view of the header taken substantially along line 3—3 of FIG. 2.

With reference to FIGS. 2 and 3, it will be seen that two additional auger assemblies 22 and 24 are also part of the header 14. FIGS. 2 and 3 also show that the header 14 includes a pair of generally upright, left and right, laterally spaced sidewalls 26 and 28 respectively that form part of the frame of the header 14. A reciprocable sickle assembly 30 or other suitable cutter extends across the front of the header 14 for severing standing crop materials from the ground as the machine advances. An upwardly and rearwardly inclined floor 32 extends between the sidewalls 26,28 and includes a left section 34 and a right section 36 that are separated in the middle by a central discharge opening 38. Auger assemblies 18–24 receive crop materials that have been mowed by the sickle assembly 30 and convey such materials centrally of the header 14 to discharge opening 38, where they leave the header and fall onto the ground into a windrow.

Details of construction of the auger assemblies 18–24 will now be described using assemblies 22 and 24 as examples, particularly assembly 22. As shown in FIG. 4, the two right auger assemblies 22 and 24 are supported by the right sidewall 28, which is of double-wall construction so as to present a pair of walls 40 and 42 that are laterally spaced apart a short distance. Using auger assembly 22 as an example, each auger assembly includes an elongated, stationary inner support 44 that includes a hollow cylindrical body 46 and a stub shaft 48 rigidly affixed to one end of the body and projecting coaxially outwardly therefrom. The inboard end of stub shaft 48 is welded to an annular end plate 50 welded to the body 46. Stub shaft 48 passes through the wall 42 and terminates at its outboard end in abutting engagement with the wall 40. A first clamp 52 secured to the outer wall 40 by bolts 54 fastens the stub shaft 48 to outer wall 40, while a second clamp 56 fixed to the inner wall 42 by bolts 58 fastens stub shaft 48 to the inner wall as well. Thus, walls 40,42 provide a sturdy cantilevered mounting arrangement for the support 44. Stub shaft 48 is hollow and open at its opposite ends to provide pass-through of hydraulic lines (not shown) for motor 62. Outboard wall 40 has an opening (not shown) to provide for entry and exit of the hydraulic lines to and from stub shaft 48.

Body 46 of support 44 is hollow, defining an internal compartment 60 that houses a power device in the form of a hydraulic motor 62. Motor 62 is located at the inboard end of support 44 and is supported at that location in coaxial relationship with the support 44 by an annular end plate 64 fixed to the body 46. The casing 65 of motor 62 is attached to an annular face plate 66 by bolts 68, and face plate 66 is in turn secured to the end plate 64 by bolts 70.

Motor 62 has its output shaft 72 (shown most clearly in FIG. 6) rotatably supported within casing 65 and projecting coaxially outwardly therefrom into fixed, driving engagement with a hub 74 that is integral with a generally triangular plate 76. Plate 76, in turn, is attached via bolts 78 to an annular, rigid connecting member 80 having an outermost peripheral surface 82.

Assembly 22 further includes an elongated, hollow housing 84 that is rotatably carried on the support 44 for rotation about the same longitudinal axis as that of the support 44 and the output shaft 72 of hydraulic motor 62. Auger housing 84 includes an annular wall 86 provided with helical flighting 88 along the length thereof. Because housing 84 is considerably longer than support 44, a chamber 90 is defined within housing 84 between the inboard end of support 44 and the corresponding inboard end of housing 84. Output shaft 72 of hydraulic motor 62, hub 74, plate 76 and connecting member 80 are all located within the chamber 90.

The peripheral surface 82 of connecting member 80 abutting engages wall 86 of housing 84 and is fixed thereto by a plurality of screws 92. Thus, hub 74, plate 76, connecting member 80, bolts 78 and screws 92 comprise structure drivingly connecting the output shaft 72 of hydraulic motor 62 with housing 84. By virtue of the fact that the output shaft 72 is rotatably supported within casing 65 of motor 62 which is in turn fixed to support 44, the inboard end of housing 84 is rotatably supported on the inboard end of support 44. On the other hand, the outboard end of housing 84 is rotatably supported on the outboard end of support 44 by bearings 94 that encircle the stub shaft 48.

OPERATION

The operation of the auger assemblies 18–24 should be apparent from the foregoing detailed description. In each instance, the auger assembly is rotatably carried on its own stationary support 44 which is in turn cantilever-supported by the walls 40,42. Driving power to each auger housing 84 is supplied by the hydraulic motor 62 contained within the inboard end of the corresponding support 44, which motor 62 also provides rotational support for the housing adjacent its outer end. This clean, uncluttered and sturdy way of supporting and driving the auger housing 84 of each assembly eliminates problems inherent in more complex chain and sprocket drive assemblies associated with the prior art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without de-parting from the spirit of the present invention.

The inventors hereby state their intent to rely on the doctrine of equivalents to determine and assess the reasonably fair scope of the present invention as pertains to any apparatus not materially departing from but outside the literal scope of the invention as set forth in the following claims.

What is claimed is:

1. An auger assembly for a crop harvesting machine comprising:
   an elongated internal support having a longitudinal axis;
   a tubular auger housing coaxially surrounding said support and rotatably mounted thereon for rotation about said axis relative to the support;
   a hydraulic motor carried by said support within the housing; and
   structure drivingly connecting the hydraulic motor with the housing.

2. In a crop harvesting header, the improvement comprising:
   a frame that includes a pair of upright sidewalls and a generally upwardly and rearwardly inclined floor extending between said sidewalls and having a central crop discharge opening therein;
   a pair of center-gathering auger assemblies projecting inwardly from each of said sidewalls respectively above said floor and terminating at said discharge opening,
   each of said auger assemblies including
      an elongated internal support having a longitudinal axis;
      a tubular auger housing coaxially surrounding said support and rotatably mounted thereon for rotation about said axis relative to the support;
      a hydraulic motor carried by said support within the housing; and
      structure drivingly connecting the hydraulic motor with the housing.

3. An auger assembly for a crop harvesting machine comprising:
   an elongated internal support having a longitudinal axis;
   a tubular auger housing coaxially surrounding said support and rotatably mounted thereon for rotation about said axis;
   a power device carried by said support; and
   structure drivingly connecting the power device with the housing,
   said support having an inner end that is recessed with respect to a corresponding inner end of the housing to define an interior chamber between the inner end of the support and the inner end of the housing,
   said power device having an output shaft coaxial with said axis and projecting axially into said chamber,
   said structure being located within said chamber and being secured to the shaft and the housing.

4. An auger assembly as claimed in claim 3,
   said housing having a tubular wall,
   said structure including a transversely extending, rigid member fixed to said shaft for rotation therewith about said axis,
   said member having a radially outer surface fastened to said wall of the housing.

5. An auger assembly as claimed in claim 4,
   said support being hollow to define an internal compartment,
   said power device being located within said compartment with said output shaft projecting beyond said inner end of the support and into said chamber.

6. An auger assembly as claimed in claim 5,
   said support having a transverse mounting plate across said inner end thereof,
   said power device being attached to said mounting plate.

7. An auger assembly as claimed in claim 6,
   said power device comprising an hydraulic motor.

8. An auger assembly for a crop harvesting machine comprising:
   an elongated internal support having a longitudinal axis;
   a tubular auger housing coaxially surrounding said support and rotatably mounted thereon for rotation about said axis;
   a power device carried by said support; and
   structure drivingly connecting the power device with the housing,
   said support including a central body that is shorter than the housing to present a pair of opposite ends that are recessed with respect to corresponding ends of the housing, one end of the body having a stub shaft projecting axially therefrom and being provided with bearings that rotatably support the corresponding end of the housing on the stub shaft, said power device including a casing and an output shaft that is rotatable relative to the casing, said casing being fixed to the other end of the body and said output shaft being fixed to the corresponding proximal end of the housing.

9. An auger assembly as claimed in claim 8, said body being hollow to define an internal compartment, said power device being located within said compartment with said output shaft projecting beyond said other end of the body.

10. An auger assembly as claimed in claim 9, said housing having a tubular wall, said structure including a transversely extending, rigid member fixed to said output shaft for rotation therewith about said axis, said member having a radially outer surface fastened to said wall of the housing.

11. An auger assembly as claimed in claim 10, said power device comprising an hydraulic motor.

12. An auger assembly as claimed in claim 8, said stub shaft being hollow.

13. In a crop harvesting header, the improvement comprising:

a frame that includes a pair of upright sidewalls and a generally upwardly and rearwardly inclined floor extending between said sidewalls and having a central crop discharge opening therein;

a pair of center-gathering auger assemblies projecting inwardly from each of said sidewalls respectively above said floor and terminating at said discharge opening, each of said auger assemblies including
an elongated internal support having a longitudinal axis;
a tubular auger housing coaxially surrounding said support and rotatably mounted thereon for rotation about said axis;
a power device carried by said support; and
structure drivingly connecting the power device with the housing, said support having an inner end that is recessed with respect to a corresponding inner end of the housing to define an interior chamber between the inner end of the support and the inner end of the housing, said power device having an output shaft coaxial with said axis and projecting axially into said chamber, said structure being located within said chamber and being secured to the shaft and the housing.

14. In a crop harvesting header as claimed in claim 13, said housing having a tubular wall, said structure including a transversely extending, rigid member fixed to said shaft for rotation therewith about said axis, said member having a radially outer surface fastened to said wall of the housing.

15. In a crop harvesting header as claimed in claim 14, said support being hollow to define an internal compartment, said power device being located within said compartment with said output shaft projecting beyond said inner end of the support and into said chamber.

16. In a crop harvesting header as claimed in claim 15, said support having a transverse mounting plate across said inner end thereof, said power device being attached to said mounting plate.

17. In a crop harvesting header as claimed in claim 16, said power device comprising an hydraulic motor.

18. In a crop harvesting header, the improvement comprising:

a frame that includes a pair of upright sidewalls and a generally upwardly and rearwardly inclined floor extending between said sidewalls and having a central crop discharge opening therein;

a pair of center-gathering auger assemblies projecting inwardly from each of said sidewalls respectively above said floor and terminating at said discharge opening, each of said auger assemblies including
an elongated internal support having a longitudinal axis;
a tubular auger housing coaxially surrounding said support and rotatably mounted thereon for rotation about said axis;
a power device carried by said support; and
structure drivingly connecting the power device with the housing, said support including a central body that is shorter than the housing to present a pair of opposite ends that are recessed with respect to corresponding ends of the housing, one end of the body having a stub shaft projecting axially therefrom and being provided with bearings that rotatably support the corresponding end of the housing on the stub shaft, said power device including a casing and an output shaft that is rotatable relative to the casing, said casing being fixed to the other end of the body and said output shaft being fixed to the corresponding proximal end of the housing.

19. In a crop harvesting header as claimed in claim 18, said stub shaft being hollow.

20. In a crop harvesting header as claimed in claim 18, said body being hollow to define an internal compartment, said power device being located within said compartment with said output shaft projecting beyond said other end of the body.

21. In a crop harvesting header as claimed in claim 20, said housing having a tubular wall, said structure including a transversely extending, rigid member fixed to said output shaft for rotation therewith about said axis, said member having a radially outer surface fastened to said wall of the housing.

22. In a crop harvesting header as claimed in claim 21, said power device comprising an hydraulic motor.

* * * * *